(12) United States Patent
Gachuz Navarro et al.

(10) Patent No.: US 10,442,367 B1
(45) Date of Patent: Oct. 15, 2019

(54) ELECTRONIC DEVICE HOLDER

(71) Applicant: Ford Global Technologies, LLC, Dearborn, MI (US)

(72) Inventors: Jose Ramon Gachuz Navarro, Cuautitlan Izcalli (MX); Eduardo Arturo Aguilar Ruelas, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 16/051,588

(22) Filed: Aug. 1, 2018

(51) Int. Cl.
   *H04M 1/04* (2006.01)
   *B60R 11/02* (2006.01)
   *B60R 11/00* (2006.01)

(52) U.S. Cl.
   CPC ... *B60R 11/0241* (2013.01); *B60R 2011/0007* (2013.01); *B60R 2011/0075* (2013.01); *H04M 1/04* (2013.01)

(58) Field of Classification Search
   CPC ...... H04M 1/04; H04M 1/6075; H04B 1/3877
   USPC .......... 455/575.1, 575.9; 224/567; 296/24.34
   See application file for complete search history.

(56) References Cited

U.S. PATENT DOCUMENTS

| | | |
|---|---|---|
| 5,745,565 A | 4/1998 | Wakefield |
| 6,929,304 B1 | 8/2005 | Dry et al. |
| 7,413,229 B2 | 8/2008 | Kukucka et al. |
| 7,708,328 B2 | 5/2010 | Doom et al. |
| 8,172,293 B2 | 5/2012 | Lota et al. |
| 8,303,016 B2 | 11/2012 | Pauken et al. |
| 9,079,540 B2 | 7/2015 | Harding et al. |
| 2004/0086112 A1 | 5/2004 | Hilger et al. |
| 2005/0147951 A1 | 7/2005 | Rohrbach |
| 2012/0298708 A1 | 11/2012 | DeAngelo |
| 2017/0005682 A1* | 1/2017 | Jeong ................... H04B 1/3877 |
| 2017/0144613 A1* | 5/2017 | Catlin ................. B60R 11/0241 |

* cited by examiner

*Primary Examiner* — Sam Bhattacharya
(74) *Attorney, Agent, or Firm* — Vichit Chea; Price Heneveld LLP

(57) ABSTRACT

An electronic device holder is provided that comprises a support member operably coupled to a housing and pivotable between first and second positions. The support member includes first and second arms defining a slot. The electronic device holder further comprises a locking assembly disposed within a cavity. The locking assembly is configured to secure the support member in one of the first and second positions.

15 Claims, 8 Drawing Sheets

ELECTRONIC DEVICE HOLDER

FIELD OF THE INVENTION

The present disclosure generally relates to an electronic device holder and more specifically to a stowable electronic device holder.

BACKGROUND OF THE INVENTION

Personal electronic devices are rapidly growing in popularity, and, as a result, vehicle users are often looking for conveniently located and secure storage spaces in a vehicle for electronic devices. Accordingly, an electronic device holder is provided herein that is configured to securely hold an electronic device and to be stowed when not in use.

SUMMARY OF THE INVENTION

According to some aspects of the present disclosure, a vehicle electronic device holder is provided that comprises a support member operably coupled to a housing and pivotable between first and second positions, first and second arms extending from the support member, a guide configured to define the first and second positions of the support member, and a spring configured to bias the guide upward and positioned within the housing.

Embodiments of this aspect of the disclosure can include any one or a combination of the following features:
  the support member includes a protrusion extending rearward of the first arm and having an engagement feature positioned parallel with a top surface of the first arm and laterally extending pivot features configured to be received by the housing;
  the guide defines first and second grooves configured to receive the engagement feature and selectively retain the support member in one of the first and second positions;
  the engagement of the engagement feature with the first and second grooves corresponds to the first and second positions of the support member, respectively;
  the housing defines a cavity, and further wherein the protrusion is positioned within the cavity so that the engagement feature is configured to rotate and selectively compress the guide and the spring;
  the housing defines lateral receiving wells positioned near an upper rim of the housing and the laterally extending pivot features are pivotably positioned within the receiving wells; and/or
  the housing defines a cup holder and the support member is disposed proximate an upper rim of the housing in the first position.

According to some aspects of the present disclosure, a vehicle electronic device holder is provided that comprises a housing defining a cavity, a support member having first and second pivot arms pivotally coupling the support member to the housing, and a first gear disposed within the cavity and operably coupled to a spring, wherein the first gear and the spring bias the support member in a first position.

Embodiments of this aspect of the disclosure can include any one or a combination of the following features:
  the support member is positioned within the cavity when the support member is in the first position;
  the first pivot arm defines a second gear positioned in communication with the first gear;
  the support member includes first and second arms defining a slot;
  the spring is compressed to release the first gear from the second gear when pressure is applied to a first side of the support member, and further wherein the support member is configured to release from the first position to the second position when the spring is compressed; and/or
  the housing defines a cover positioned outwardly of the first and second pivot arms and the first gear, and further wherein the cover is positioned substantially flush with the first side of the support member.

According to some aspects of the present disclosure, an electronic device holder is provided that comprises a support member operably coupled to a housing and pivotable between first and second positions and a locking assembly disposed within a cavity. The support member has first and second arms defining a slot. The locking assembly is configured to secure the support member in one of the first and second positions.

Embodiments of this aspect of the disclosure can include any one or a combination of the following features:
  the support member is positioned within the cavity when the support member is in the first position;
  the locking assembly comprises a guide defining first and second grooves, wherein the first and second grooves are configured to define the first and second position of the support member and selectively secure the support member in the first and second positions, respectively; and a spring configured to bias the support member in the first position;
  the support member includes a protrusion extending outwardly from the first arm and having an engagement feature, and further wherein the engagement feature is selectively engageable with one of the first and second grooves of the guide;
  the cavity defines lateral receiving wells and laterally extending pivot features of the protrusion are positioned within the receiving wells;
  the support member includes first and second pivot arms extending from a body portion of the support member and including laterally extending pivots configured to rotatably couple the support member to the housing;
  the locking assembly comprises a first gear assembly operably coupled to the housing and including a spring, the spring configured to bias the support member toward the first position; and a second gear defined by the first pivot arm and in communication with the first gear; and/or
  the second gear rotates relative to the first gear, and further wherein the spring is configured maintain the second gear in contact with the first gear to secure the support member in the first and second positions.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
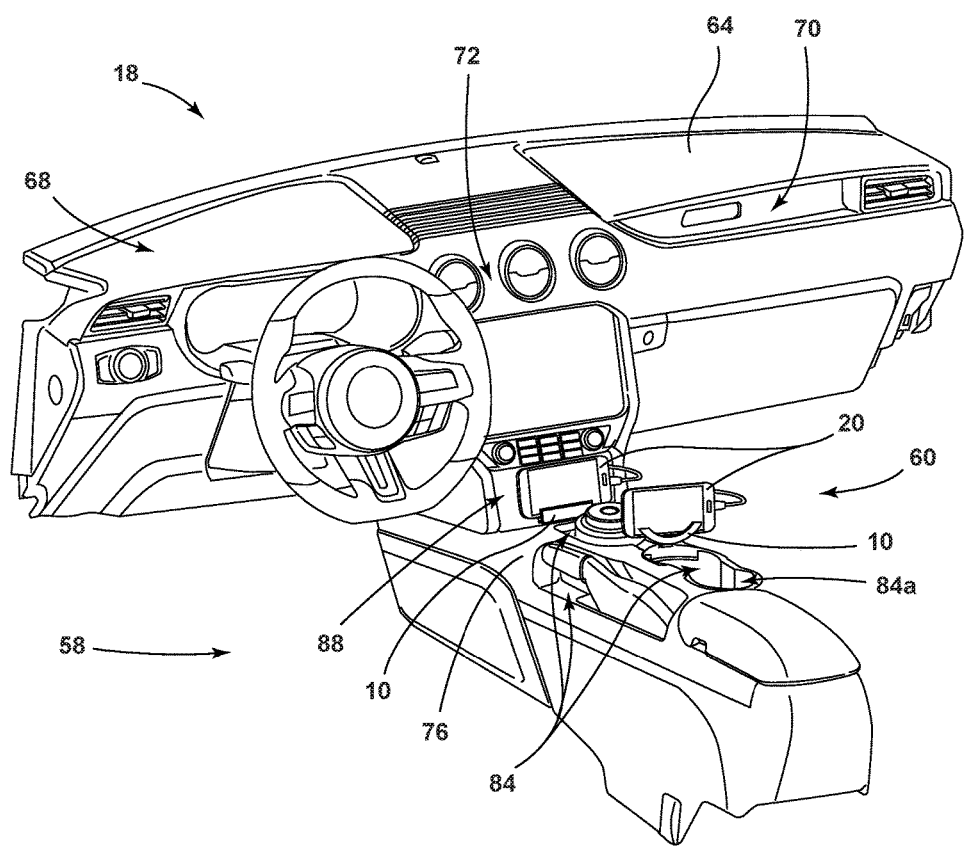
FIG. 1 is a perspective view of an interior of a vehicle having a first and second electronic device holder.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a holder for an electronic device for a vehicle that may be positioned within a vehicle interior. The electronic device holder may include a support member with first and second arms extending from a body portion and movable between first and second positions. The support member may be stowed within a housing when in the first position and may protrude from the housing when in the second position to allow a slot defined by the first and second arms of the support member to receive and support the electronic device. The electronic device holder provides a designated place to support and/or secure the electronic device, preventing damage to the phone and rattling that may be caused using various spaces (e.g., cup holders, interior door arm rests, or interior door panel) in the vehicle not specifically designed to hold the electronic device.

Figure 2:
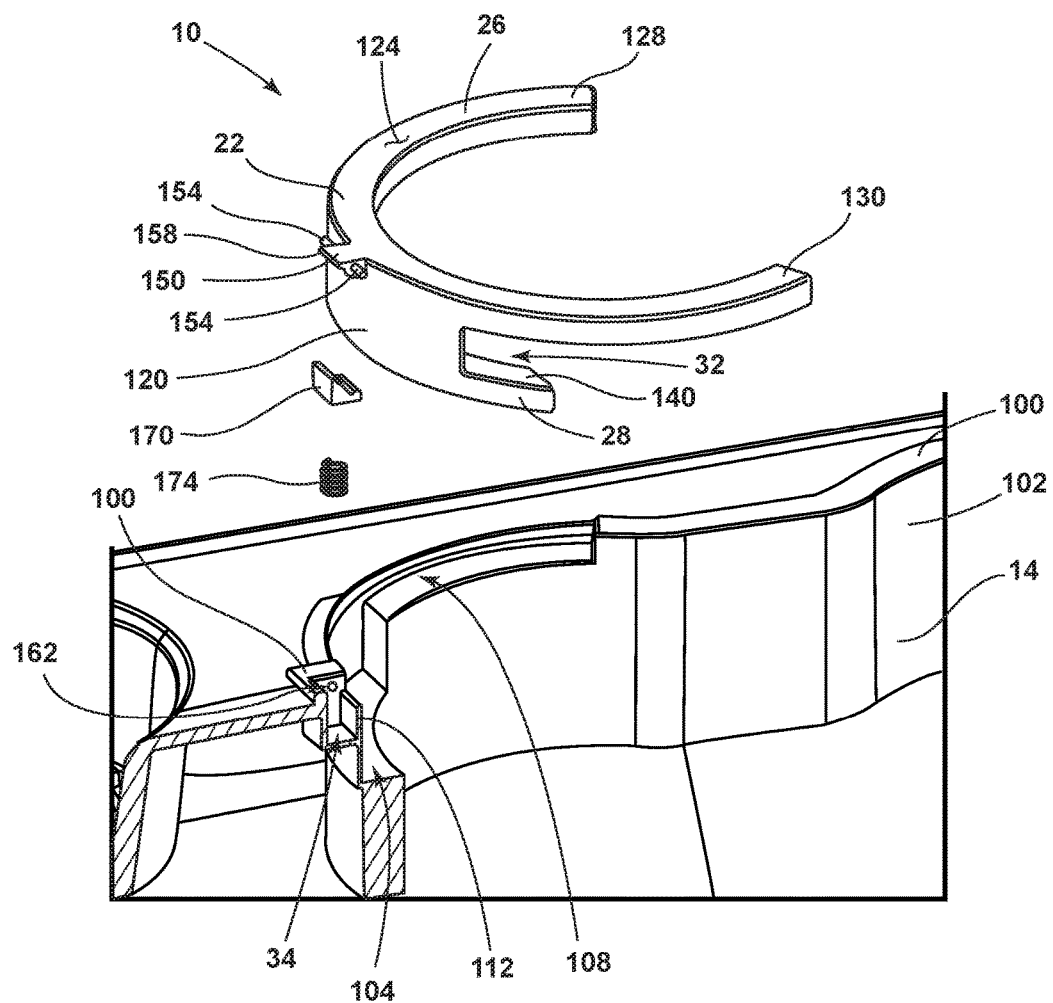
FIG. 2 is an exploded view of an electronic device holder, according to some examples.
Figure 3A:
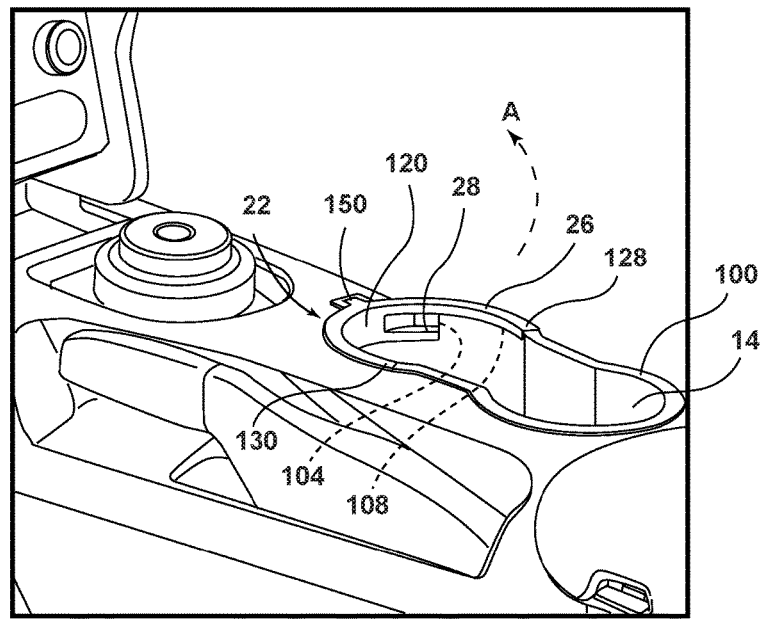
FIG. 3A is a side perspective view of the electronic device holder of FIG. 2 in a first position.
Figure 3B:
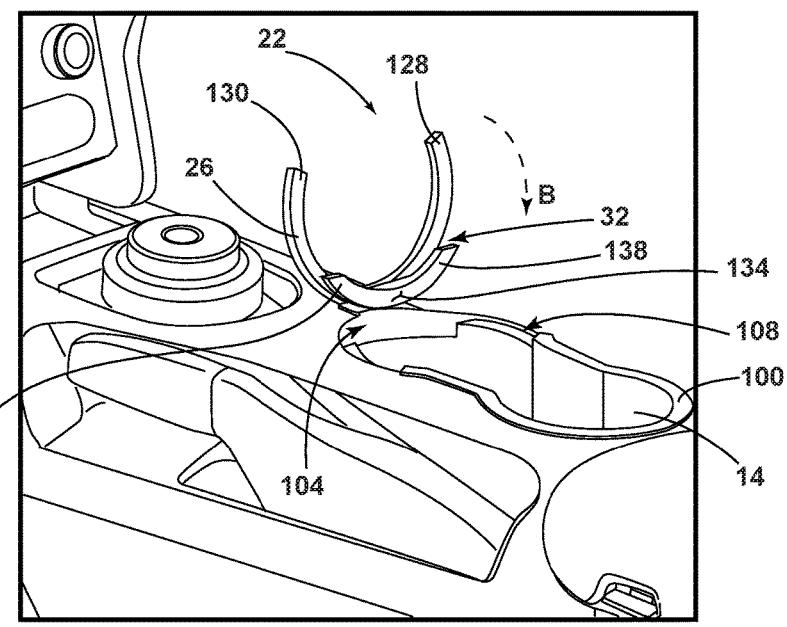
FIG. 3B is a side perspective view of the electronic device holder of FIG. 2 in a second position.

Referring to FIGS. 1-9, reference numeral 10 generally denotes an electronic device holder that includes a support member 22 operably coupled to a housing 14 and pivotable between a first position (as exemplarily illustrated in FIG. 3A) and a second position (as exemplarily illustrated in FIG. 3B). The support member 22 includes first and second arms 26, 28 defining a slot 32 therebetween. The electronic device holder 10 also includes a locking assembly 30 disposed within a cavity 34. The locking assembly 30 is configured to retain the support member 22 in the first and second positions.

Referring now to FIG. 1, a vehicle interior 18 is generally illustrated including a driver side 58 and a passenger side 60. An instrument panel 64 spans laterally across the front of the vehicle interior 18. The instrument panel 64 may be divided into a driver side portion 68, a passenger side portion 70, and a center stack portion 72. Each of these portions 68, 70, 72 may serve different functions and include various electrical and mechanical components. A center console 76 may be coupled to the center stack portion 72. The center console 76 extends vehicle rearward from the center stack portion 72 and is positioned between the driver side 58 and the passenger side 60. The center console 76 may define various apertures 84 for receiving features such as cup holders, USB plugs, an emergency brake, etc. In some examples, the electronic device holder 10 may be positioned proximate the cup holder aperture 84a. Together with the center stack portion 72, the center console 76 may further define a space 88. In some examples, the electronic device holder 10 may be positioned within the space 88. In other examples, the vehicle interior 18 may include multiple electronic device holders 10, where an electronic device holder 10 is positioned within the space 88 and another electronic device holder 10 is positioned proximate the cup holder aperture 84a. It will be understood that the locations of the cup holder aperture 84a and the space 88 are exemplary only and may be positioned in any location within the vehicle interior 18 without departing from the scope of the present disclosure.

Referring now to FIG. 2, the electronic device holder 10 is shown, according to some examples. The electronic device holder 10 includes the housing 14 positioned within the vehicle interior 18 and the support member 22 operably coupled to the housing 14. The housing 14 includes an upper rim 100 and an outer wall 102 and may define a cup holder. The upper rim 100 and the outer wall 102 define a receiving well 104 and a channel 108. The channel 108 is positioned between the upper rim 100 and the receiving well 104 and is in communication with the receiving well 104. The receiving well 104 is partially defined by a dividing wall 112 which also partially defines the cavity 34. The cavity 34 is defined by the housing 14 and extends away from the dividing wall 112 in a direction opposite the receiving well 104.

Referring now to FIGS. 2-3B, the support member 22 includes a body portion 120, the first arm 26, and the second arm 28. Both the first arm 26 and the second arm 28 are generally C-shaped. The first arm 26 includes a top surface 124 and first and second ends 128, 130, and the second arm includes a bottom surface 134 and first and second ends 138, 140. The first and second arms 26, 28 are positioned on opposing sides of the body portion 120 so that the body portion 120 extends from the top surface 124 of the first arm 26 to the bottom surface 134 of the second arm 28. In some examples, the first arm 26 extends beyond the second arm 28 so that the first and second ends 138, 140 of the second arm are closer to the body portion 120 than the first and second ends 128, 130 of the first arm 26. However, in other examples, the first arm 26 and the second arm are the same size, placing the first and second ends 138, 140 of the second arm 28 below and aligned with the first and second ends 128, 130 of the first arm 26.

When the support member 22 is in the first position, or stowed position, the body portion 120 and the second arm 28 are positioned within the receiving well 104 and the first arm 26 is positioned within the channel 108 of the housing 14 such that a pivot extension 150 is positioned over the cavity 34. The pivot extension 150 is positioned proximate the first arm 26 and aligned with the top surface 124 of the first arm 26. The pivot extension 150 includes laterally extending pivot features 154 and an engagement feature 158. The laterally extending pivot features 154 are positioned on either side of the pivot extension 150 and are received by lateral receiving wells 162 defined by the housing 14. The engagement feature 158 extends from the pivot extension 150 aligned with the top surface 124 of the first arm 26 and is configured to be positioned perpendicular to the upper rim 100 of the cavity 34 when the support member 22 is in the first position. Together with a guide 170 and a spring 174, the pivot extension 150 forms the locking assembly 30 configured to selectively secure the support member 22 in the first position (see FIG. 3A) or the second position (see FIG. 3B).

Referring now to FIGS. 3A and 3B, as discussed elsewhere herein, when the support member 22 is operably coupled to the housing 14, the support member is pivotable between the first position and the second position. In the first position, as shown in FIG. 3A, the top surface 124 of the first arm 26 of the support member 22 may be positioned substantially flush with the upper rim 100 of the housing 14 and received by the channel 108. The body portion 120 and the second arm 28 may be positioned within the receiving well 104, stowing the support member 22 within the housing 14 and creating a cohesive aesthetic. When the support member 22 is moved into the second position, the support member 22 is rotated along the path indicated by arrow A. In the second position, as shown in FIG. 3B, the support member 22 may be substantially perpendicular to the upper rim 100. When the support member 22 is no longer in use, the support member 22 may be rotated along the path indicated by arrow B. The support member 22 may then be at least partially stowed within the receiving well 104 and the channel 108, returning the support member 22 to the first position.

Referring now to FIGS. 3A-4C, the support member 22 includes the locking assembly 30 configured to define the first and second positions of the support member 22 and to secure the support member 22 in one of the first position and the second position, as discussed elsewhere herein. The locking assembly 30 is positioned within the cavity 34 and includes the pivot extension 150 having at least one engagement feature 158 and the laterally extending pivot features 154. The guide 170 is configured to slide from a first position (see FIG. 4A) to a second position (see FIG. 4C) within the cavity 34 and is configured to guide the support member 22 between the first and second positions of the support member 22 (see FIGS. 3A and 3B) as the guide 170 moves between the first and second positions of the guide 170. The guide 170 includes a first surface 190 configured to at least partially abut the pivot extension 150 and the engagement feature 158. The guide 170 further includes a second surface 194 configured to abut the spring 174. The second surface 194 is configured to depress the spring 174 as the guide 170 moves between the first and second positions.

The first surface 190 defines a first groove 198 and a second groove 200. The first and second grooves 198, 200 are configured to receive the engagement feature 158. Each of the first and second grooves 198, 200 respectively correspond to the first and second positions of the support member 22 and the first and second positions of the guide 170. The first and second grooves 198, 200 are configured to secure the support member 22 in the first and second positions and the first surface 190 that extends between the first and second grooves 198, 200 is configured to guide the engagement feature 158 between the first groove 198 to the second groove 200. Each of the grooves 198, 200 may be generally semi-cylindrical, allowing the engagement feature 158 to slide in and out of engagement when pressure is applied to support member 22.

Figure 4A:
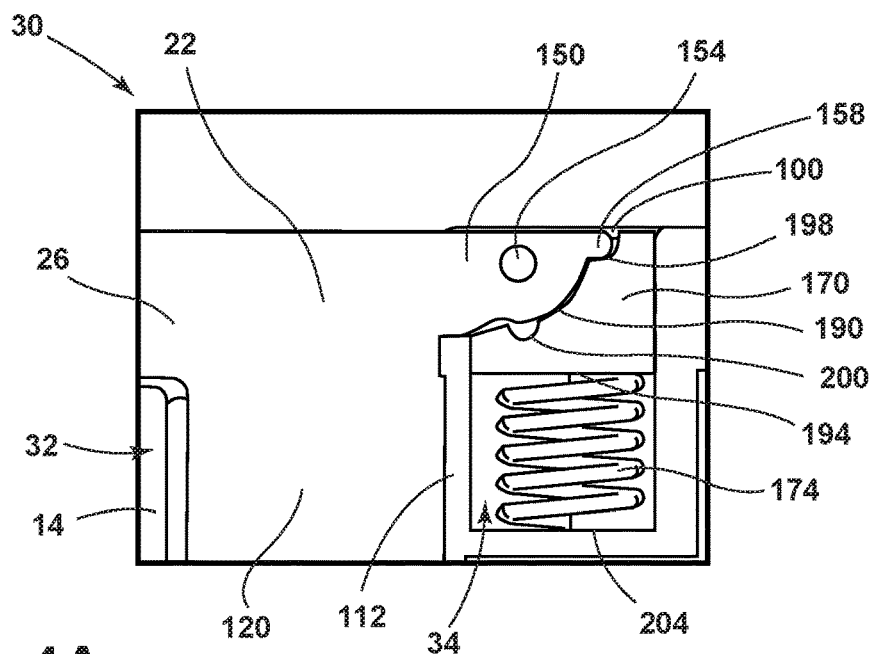
FIG. 4A is a cross-sectional view of a locking assembly of an electronic device holder with a locking assembly in a first position.
Figure 4B:
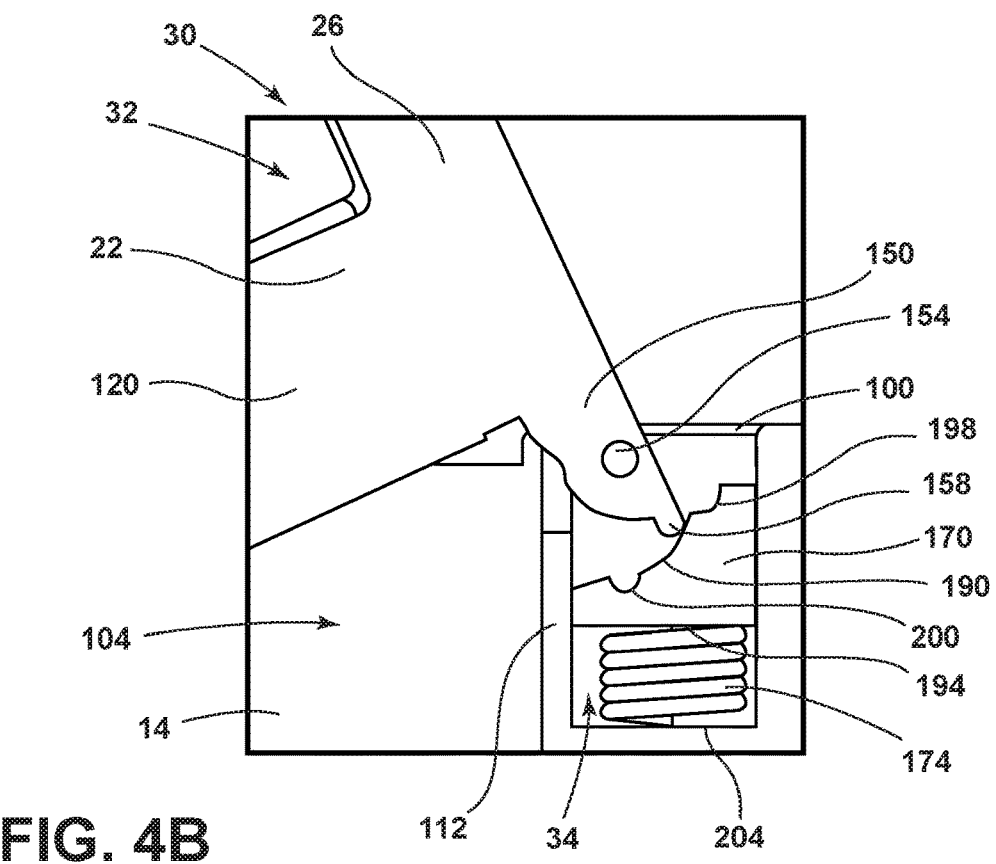
FIG. 4B is a cross-sectional view of the locking assembly of the electronic device holder of FIG. 4A with the locking assembly between a first position and a second position.
Figure 4C:
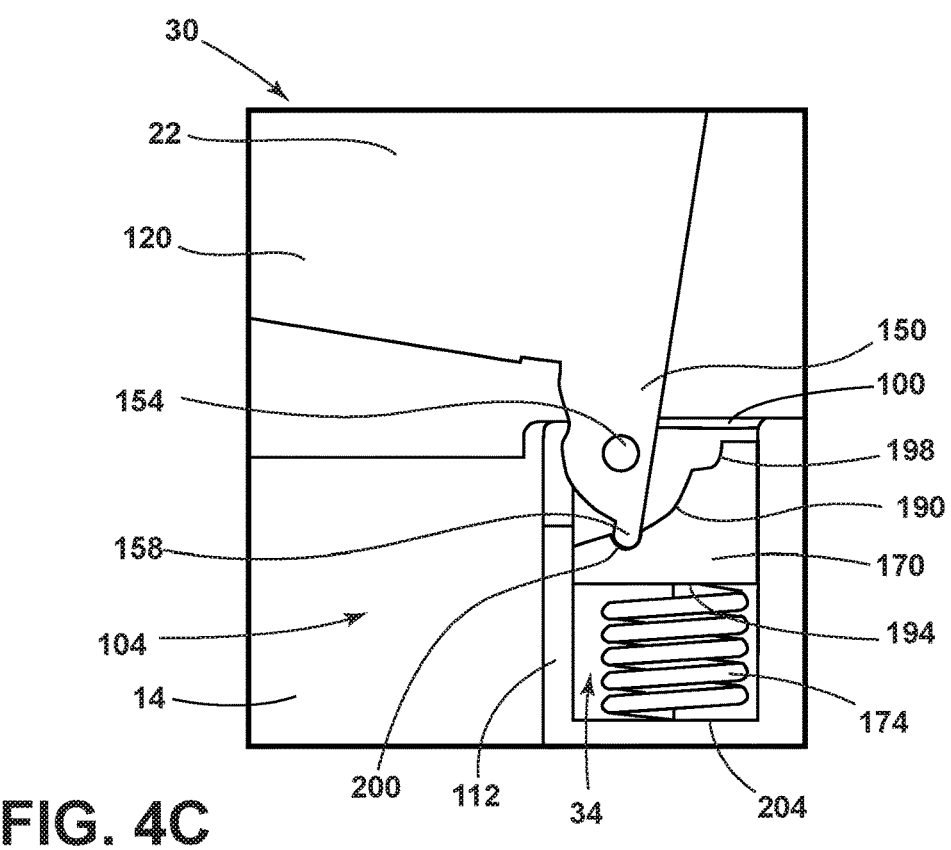
FIG. 4C is a cross-sectional view of the locking assembly of the electronic device holder of FIG. 4A with the locking assembly in a second position.

When the engagement feature 158 is received by the first groove 198 and the guide 170 is in the first position, as shown in FIG. 4A, the guide 170 is positioned proximate to the upper rim 100 of the housing 14 and the spring 174 is in a decompressed state between the second surface 194 of the guide 170 and a bottom surface 204 partially defining the cavity 34. When the support member 22 is moved to the second position, the engagement feature 158 slides along the first surface 190 (see FIG. 4B) until the engagement feature 158 is received by the second groove 200, as shown in FIG. 4C. When the engagement feature 158 is received by the second groove 200, the support member 22 is secured in the second position and the spring 174 is in a compressed state. The spring 174 is configured to bias the support member 22 in the first position by pressing upward on the second surface 194 of the guide 170.

Figure 5:
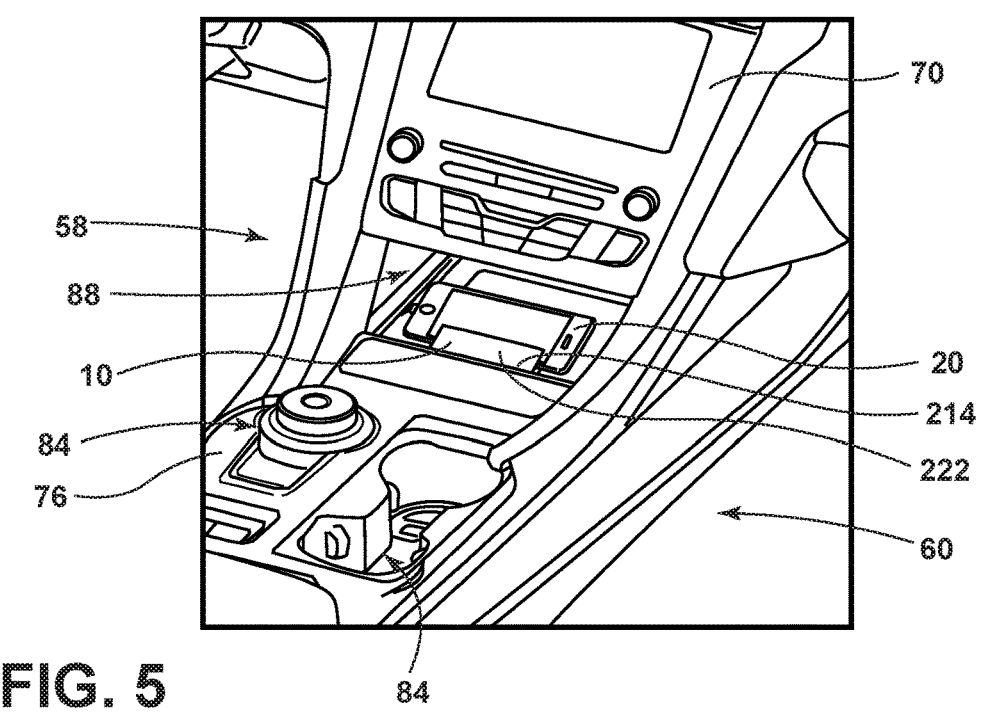
FIG. 5 is a front perspective view of an electronic device holder, according to some examples.

Referring now to FIGS. 1 and 5, according to some examples, the electronic device holder 10 includes a generally linear support member 222 and is positioned within the space 88 of the center console 76. The support member 222 may be received by a housing 214 positioned within the space 88. When the electronic device holder 10 is in use, the electronic device 20 is secured by the support member 222 within the space 88 to provide easy access to the electronic device 20 while storing the electronic device 20 out of the way of the user. It will be understood that the electronic device holder 10 may be positioned in various places within the vehicle without departing from the scope of the present disclosure, as disclosed elsewhere herein.

Figure 6:
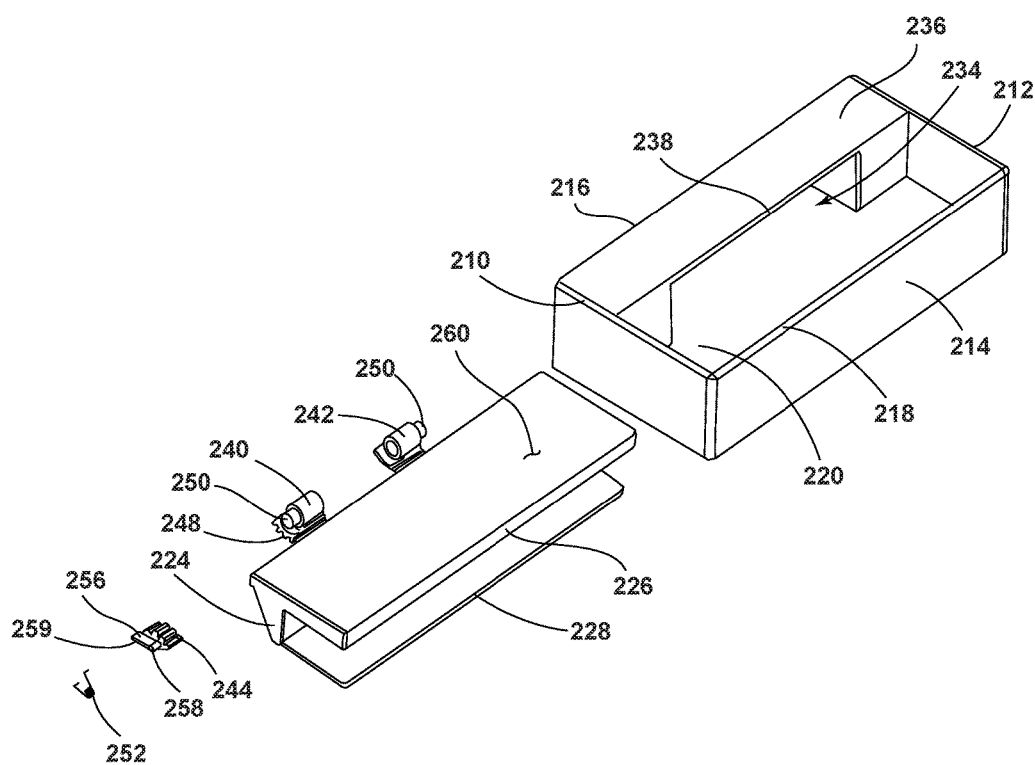
FIG. 6 is an exploded view of the electronic device holder of FIG. 5.

Referring now to FIG. 6, a housing 214 is configured to receive the support member 222. The housing includes first and second lateral sides 210, 212 joined by a front side 216 and a rear side 218. A bottom surface 220 further connects the first and second lateral sides 210, 212, the front side 216, and the rear side 218. The housing 14 further includes a cover 236 extending between the first and second lateral sides 210, 212 and positioned flush with the front side 216. The cover 236 includes an outer edge 238 extending parallel to the rear side 218. When the electronic device holder 10 is assembled, the cover 236, the first and second lateral sides 210, 212, and the front side 216 define a cavity 234 configured to at least partially receive the support member 222.

The support member 222 includes a body portion 224 having first and second arms 226, 228 which may extend parallel to one another from opposing ends of the body portion 224. The first and second arms 226 together define a slot 232 configured to receive the electronic device (see FIG. 8). Each of the first and second arms 226, 228 may be generally linear, giving the support member 222 an overall rectangular shape. First and second pivot arms 240, 242 extend from the body portion 224 of the support member 222. The first and second pivot arms 240, 242 are configured to pivotally couple the support member 222 to the housing 214. Each pivot arm 240, 242 may include a generally cylindrical protrusion 250 configured to pivotally couple each of the pivot arms 240, 242 to the housing 214. It will be understood than any method of pivotally coupling the pivot arms 240, 242 to the housing 214 may be used without departing from the scope of the present disclosure.

A first gear 244 is positioned within the cavity 234 and operably coupled to the housing 214 by an extension 256. The extension 256 includes a first portion 258 and a second portion 259. The first portion 258 may be generally cylindrical and configured to be coupled with a spring 252. The second portion 259 extends from the first portion toward the front side 216 of the housing (see FIG. 9). The first pivot arm 240 includes a second gear 248 positioned in communication with the first gear 244. As discussed elsewhere herein, the relationship between the first gear 244, the second gear 248, and the spring 252 secures the support member 22 in a first position. The second gear 248 is in selective communication with the first gear 244 and may be released by a user. When released, the second gear 248 rotates relative to the first gear 244 to secure the support member 22 in one of the first and second positions.

Figure 7:
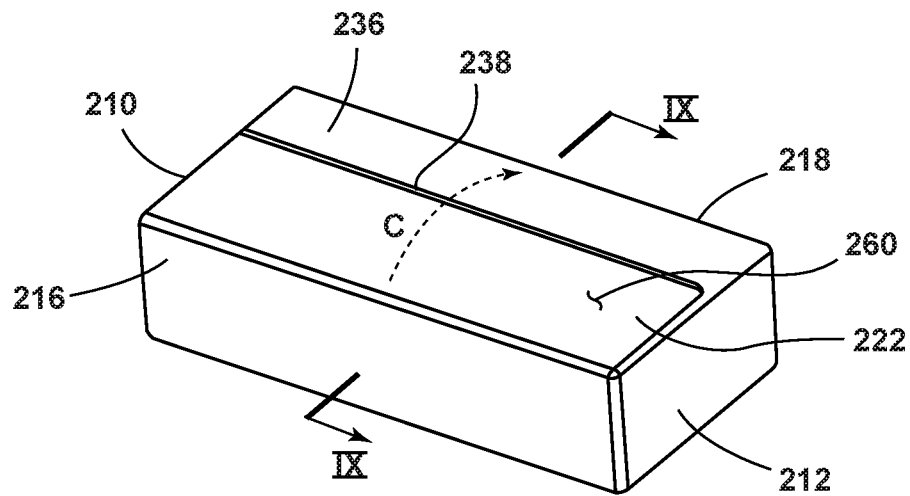
FIG. 7 is a side perspective view of the electronic device holder of FIG. 5 in a first position.
Figure 8:
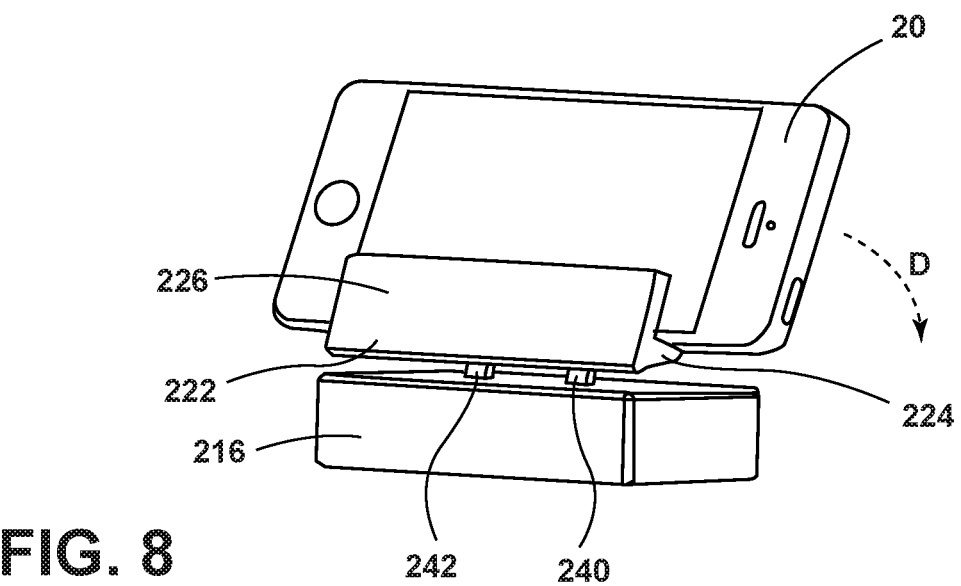
FIG. 8 is a side perspective view of the electronic device holder of FIG. 5 in a second position.

Referring now to FIGS. 7 and 8, the support member 222 is pivotable between the first position (FIG. 7) and the second position (FIG. 8). When the support member 222 is in the first position, the support member 222 may be within the cavity 234. In the first position, a top surface 260 of the support member 222 is positioned flush with the cover 236. As discussed elsewhere herein, the support member 222 is secured in the first position by the engagement of the first gear 244 with the second gear 248. When released, the support member 222 is pivotable along a path as indicated by arrow C to the second position. When the support member 222 is in the second position, the support member 222 is positioned outward of the cavity 234. Each of the first and second pivot arms 240, 242 abuts the outer edge 238 of the cover 236, preventing the support member 222 from over-rotating. An electronic device 20 may be received by the support member 222 when the support member 222 is in the second position. As discussed elsewhere herein, the support member 222 is secured in the second position by the engagement of the first gear 244 with the second gear 248 and may be pushed along a path indicated by arrow D back into the first position.

Figure 9:
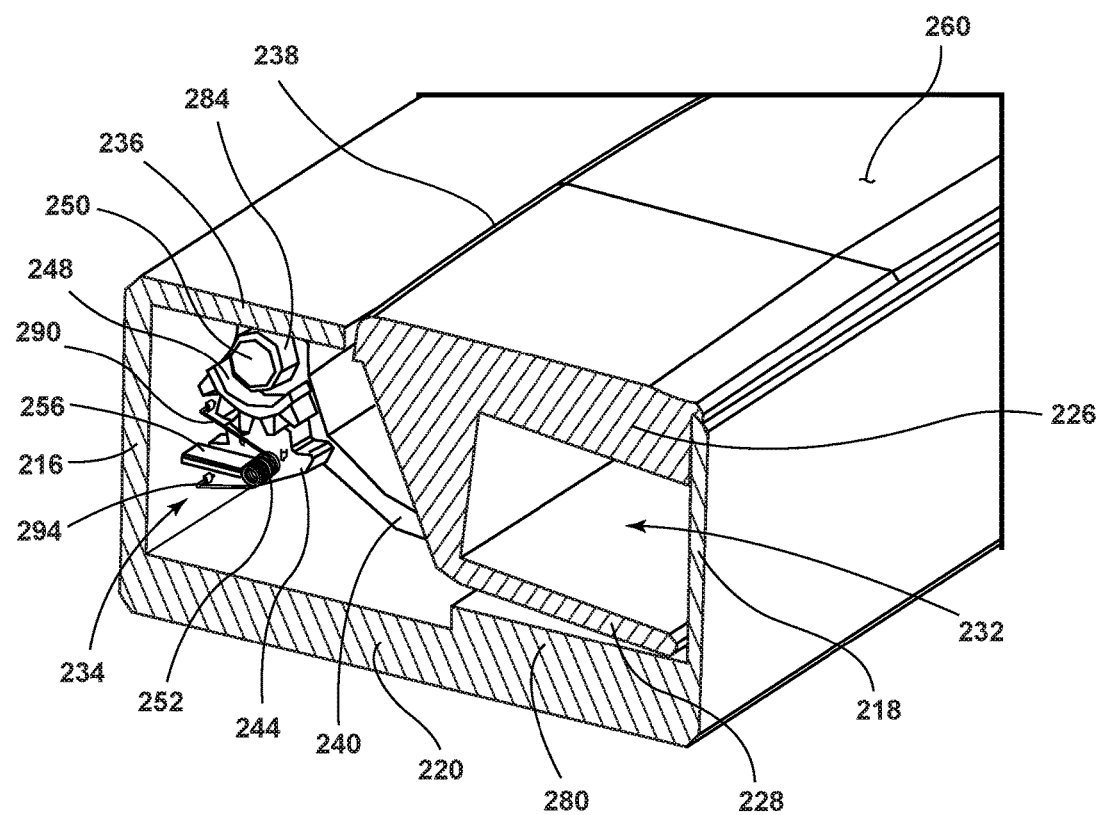
FIG. 9 is a cross-sectional view of the electronic device holder of FIG. 7 taken along line IX-IX.

Referring now to FIG. 9, the support member 222 is shown in the first position with the protrusions of the first and second pivot arms 240, 242 engaged with receiving wells 284 formed by the housing 214. The first gear 244 is engaged with the second gear 248 and biased into engagement by the spring 252. The spring 252 is coupled to the second gear 248 and includes first and second ends 290, 294 configured to be secured coupled to the front side 216 of the housing 214. The first and second ends 290, 294 secure the spring 252 and allow the spring 252 to be loaded using rotation of the first and second gears 244, 248. The support member 22 is configured to release from the first position when pressure is applied to the top surface 260 of the support member 22. When pressure is applied, the second gear 248 is rotated towards the front side 216. The second gear 248 rotates the first gear 244 and the spring toward the front side 216 at the same time, creating a buildup of momentum in the spring 252. The spring 252 then provides a force opposite the front side 216 to propel the support member 222 out of the housing 214 and into the second position. When the support member 222 is returned the first position, the second gear 248 rotates back into full engagement with the first gear 244, securing the support member 222 within the housing 214. In some examples, the bottom surface 220 may include a step 280 configured to further support the support member 222 in the first position. In other examples, when the support member 222 is received by the housing 214, the bottom surface 220 may be continuous, and the support member 222 may be flush against the bottom surface 220.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Some examples of operably coupleable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the disclosure as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle electronic device holder, comprising:
   a support member operably coupled to a housing having a rim, the support member pivotable between first and second positions, wherein the support member includes a protrusion extending rearward of the first arm and having an engagement feature positioned parallel with a top surface of the first arm and laterally extending pivot features configured to be received by the housing;
   first and second arms extending from the support member, the first arm positioned proximate the rim and spaced apart from the second arm, wherein the first and second arms are non-linear;
   a guide configured to define the first and second positions of the support member; and
   a spring configured to bias the guide upward and positioned within the housing.

2. The electronic device holder of claim 1, wherein the guide defines first and second grooves configured to receive the engagement feature and selectively retain the support member in one of the first and second positions.

3. The electronic device holder of claim 2, wherein the engagement of the engagement feature with the first and second grooves correspond to the first and second positions of the support member, respectively.

4. The electronic device holder of claim 1, wherein the housing defines a cavity, and further wherein the protrusion is positioned within the cavity so that the engagement feature is configured to rotate and selectively compress the guide and the spring.

5. The electronic device holder of claim 4, wherein the housing defines lateral receiving wells positioned near an upper rim of the housing and the laterally extending pivot features are pivotably positioned within the receiving wells.

6. The electronic device holder of claim 1, wherein the housing defines a cup holder and the support member is disposed proximate an upper rim of the housing in the first position.

7. A vehicle electronic device holder comprising:
   a housing defining a cavity;
   a support member having first and second pivot arms pivotally coupling the support member to the housing; and
   a first gear disposed within the cavity and operably coupled to a spring, wherein the first gear and the spring bias the support member in a first position, and further wherein the support member is configured to release from the first position to a second position when the spring is compressed.

8. The electronic device holder of claim 7, wherein the support member is positioned within the cavity when the support member is in the first position.

9. The electronic device holder of claim 7, wherein the first pivot arm defines a second gear positioned in communication with the first gear.

10. The electronic device holder of claim 7, wherein the support member includes first and second arms defining a slot.

11. The electronic device holder of claim 7, wherein the spring is compressed to release the first gear from a second gear when pressure is applied to a first side of the support member.

12. The electronic device holder of claim 11, wherein the housing defines a cover positioned outwardly of the first and second pivot arms and the first gear, and further wherein the cover is positioned substantially flush with the first side of the support member.

13. An electronic device holder, comprising:
   a support member operably coupled to a housing and pivotable between first and second positions, the support member having first and second arms defining a slot, wherein the first and second arms extend from the support member such that the first arm is positioned between a rim of the housing and the second arm and is parallel to the second arm when the support member is in the first position; and
   a locking assembly disposed within a cavity, the locking assembly configured to secure the support member in one of the first and second positions, wherein the locking assembly comprises:
      a guide defining first and second grooves, wherein the first and second grooves are configured to define the first and second positions of the support member and selectively secure the support member in the first and second positions, respectively; and
      a spring configured to bias the support member in the first position.

14. The electronic device holder of claim 13, wherein the support member includes a protrusion extending outwardly from the first arm and having an engagement feature, and further wherein the engagement feature is selectively engageable with one of the first and second grooves of the guide.

15. The electronic device holder of claim 14, wherein the cavity defines lateral receiving wells and laterally extending pivot features of the protrusion are positioned within the receiving wells.

* * * * *